United States Patent
Takebayashi et al.

(10) Patent No.: US 7,399,244 B2
(45) Date of Patent: Jul. 15, 2008

(54) APPARATUS FOR CONTROLLING A BICYCLE GEAR SHIFT DEVICE BASED ON MOVEMENT OF THE DEVICE

(75) Inventors: Haruyuki Takebayashi, Yao (JP); Koji Uno, Naniwaku (JP); Tadashi Ichida, Ikoma (JP); Ryuichiro Takamoto, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 400 days.

(21) Appl. No.: 10/907,847

(22) Filed: Apr. 18, 2005

(65) Prior Publication Data

US 2005/0255950 A1 Nov. 17, 2005

(30) Foreign Application Priority Data

Apr. 28, 2004 (JP) .............................. 2004-133279

(51) Int. Cl.
*F16H 61/00* (2006.01)
*B62M 9/12* (2006.01)

(52) U.S. Cl. .......................................... 474/70; 474/70

(58) Field of Classification Search ................... 474/70, 474/69; 280/260, 259, 261; 318/5
See application file for complete search history.

(56) References Cited

U.S. PATENT DOCUMENTS 5,357,177 A 10/1994 Fey et al.
6,367,833 B1 * 4/2002 Horiuchi ..................... 280/260
6,454,288 B1 * 9/2002 Horiuchi ..................... 280/260
6,467,786 B2 * 10/2002 Horiuchi ..................... 280/260
6,767,308 B2 * 7/2004 Kitamura ....................... 477/7
6,866,279 B2 * 3/2005 Fujii .......................... 280/260
6,877,755 B2 * 4/2005 Takamoto ................... 280/260

FOREIGN PATENT DOCUMENTS

| JP | 05-319357 A | 3/1993 |
| JP | 10-181670 A | 7/1998 |
| JP | 10-181671 A | 7/1998 |
| JP | 2000-283283 A | 10/2000 |
| JP | 2001-071985 A | 3/2001 |
| JP | 2001-071986 A | 3/2001 |

OTHER PUBLICATIONS

European search report for EP 050009119.8, the European application that corresponds to this application, dated Feb. 27, 2007.

* cited by examiner

*Primary Examiner*—Tony H. Winner
(74) *Attorney, Agent, or Firm*—James A. Deland

(57) ABSTRACT

An apparatus for controlling a gear shift device comprises a gear shift controller that operates the gear shift device from a first gear position to a second gear position during a gear shift operation, a movement sensor that detects movement of the gear shift device, a timer, and a gear shift stopping unit that provides a signal to the gear shift controller to stop the gear shift operation when the timer measures a first time interval during which the movement sensor does not sense movement of the gear shift device.

22 Claims, 16 Drawing Sheets

APPARATUS FOR CONTROLLING A BICYCLE GEAR SHIFT DEVICE BASED ON MOVEMENT OF THE DEVICE

BACKGROUND OF THE INVENTION

The present invention is directed to bicycles and, more particularly, to an apparatus for controlling a bicycle shift device based on movement of the bicycle shift device.

Bicycle transmissions that comprise front and rear derailleurs or internal hub transmissions are well known. In derailleur transmissions, the front derailleur shifts a chain among a plurality of front sprockets that are coaxially mounted to the pedal crank shaft, and the rear derailleur shifts the chain among a plurality of rear sprockets that are coaxially mounted to the rear wheel. Internal hub transmissions include a planetary gear mechanism disposed inside of a wheel hub and a clutch mechanism that switches the planetary gear mechanism to provide a plurality of power transmission paths. It is also known to use electric motors to operate the front and rear derailleurs or the internal hub transmission. Such a system is shown in Japanese Patent Application No. 2002-87371.

Electrically operated bicycle transmissions may operate manually or automatically. In manually operated electrical bicycle transmissions, a button or lever on a shift control device mounted to the bicycle handlebar is manipulated so that a gear shift command is output to operate the motor and upshift or downshift the bicycle transmission accordingly. In automatically operated electrical bicycle transmissions, gear shift commands are generated automatically based on bicycle speed.

In conventional electrically operated bicycle transmissions, when a gear shift command is received, the motor is operated continuously until gear shifting is completed. However, in derailleur-based transmissions, when a large amount of power is required to move the derailleur from one sprocket to another, such as when there is a problem with the chain, or when the gear shift operation is carried out when the bicycle is stationary, the motor may become overloaded and stop moving during the gear shift operation. Similarly, with internal hub transmissions, it may be difficult to operate the clutch mechanism during strong pedaling forces, and again the motor may become overloaded and stop moving during the gear shift operation. Because the derailleur or internal hub transmission has not arrived at the next gear position when the motor stops moving in such situations, electric power continues to be supplied to the motor. As a result, electric power may be wastefully supplied from the battery or other power supply, thereby shortening the life of the power supply.

SUMMARY OF THE INVENTION

The present invention is directed to various features of an apparatus for controlling a gear shift device. In one embodiment, an apparatus for controlling a gear shift device comprises a gear shift controller that operates the gear shift device from a first gear position to a second gear position during a gear shift operation, a movement sensor that detects movement of the gear shift device, a timer, and a gear shift stopping unit that provides a signal to the gear shift controller to stop the gear shift operation when the timer measures a first time interval during which the movement sensor does not sense movement of the gear shift device. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
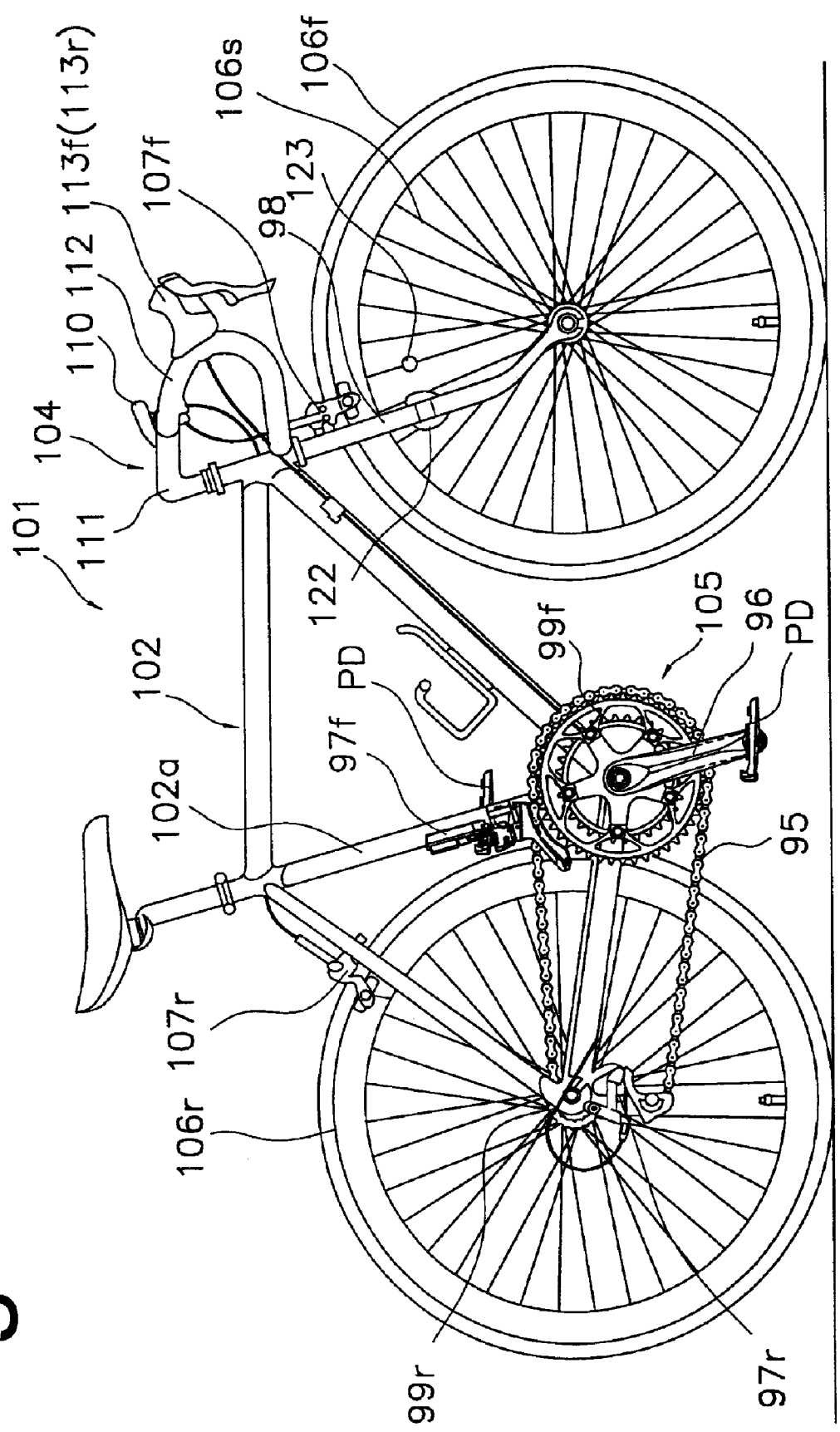
FIG. 1 is a side view of a particular embodiment of a bicycle.

FIG. 1 is a side view of a bicycle 101 that includes particular embodiments of electrically controlled components. Bicycle 101 is a road bicycle comprising a diamond-shaped frame 102, a front fork 98 rotatably mounted to frame 102, a handlebar assembly 104 mounted to the upper part of fork 98, a front wheel 106$f$ rotatably attached to the lower part of fork 98, a rear wheel 106$r$ rotatably attached to the rear of frame 102, and a drive unit 105. A front wheel brake 107$f$ is provided for braking front wheel 106$f$, and a rear wheel brake 107$r$ is provided for braking rear wheel 106$r$.

Figure 5:
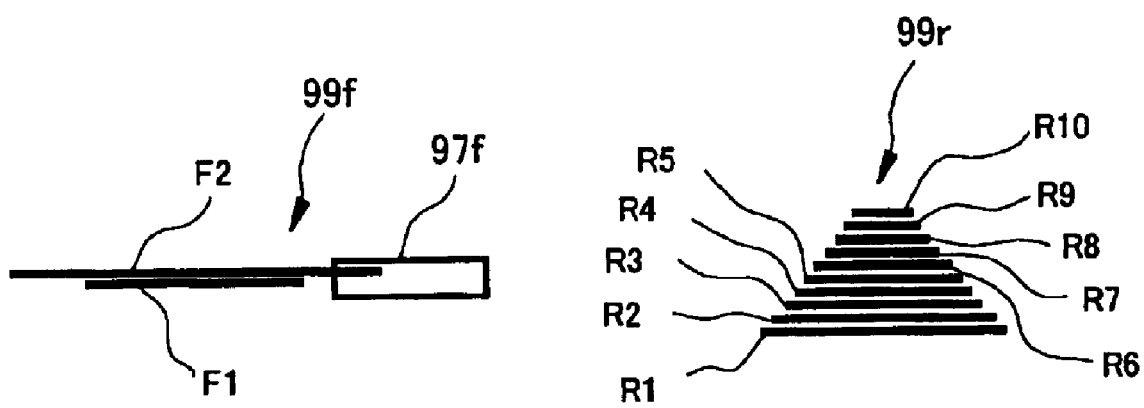
FIG. 5 is a schematic diagram of the front and rear sprocket assemblies.

Drive unit 105 comprises a chain 95, a front sprocket assembly 99$f$ coaxially mounted with a crank 96 having pedals PD, an electrically controlled front derailleur 97$f$ attached to a seat tube 102$a$ of frame 102, a rear sprocket assembly 99$r$ coaxially mounted with rear wheel 106$r$, and an electrically controlled rear derailleur 97$r$. As shown in FIG. 5, front sprocket assembly 99$f$ comprises two coaxially mounted sprockets F1-F2, and rear sprocket assembly 99$r$ comprises ten sprockets R1-R10 mounted coaxially with an axle 145 (FIG. 7) of rear wheel 106$r$. The number of teeth on front sprocket F1 is less than the number of teeth on front sprocket F2. The numbers of teeth on rear sprockets R1-R10 gradually decrease from rear sprocket R1 to rear sprocket R10. As a result, rear sprocket R1 has the greatest number of teeth, and rear sprocket R10 has the least number of teeth.

Front derailleur 97*f* moves to two operating positions to switch chain 95 between front sprockets F1 and F2 using a front derailleur motor 97*fm* (FIG. 6), and rear derailleur 97*r* moves to ten operating positions to switch chain 95 among selected ones of the rear sprockets R1-R10 using a rear derailleur motor 97*rm*. A front gear position sensor 133*f* comprising optical sensors PHO-1 and PHO-2 senses movement and direction of movement of front derailleur motor 97*fm* as well as the operating position of front derailleur 97*f*. Similarly, a rear gear position sensor 133*r* comprising optical sensors PHO-1 and PHO-2 senses movement and direction of movement of rear derailleur motor 97*rm* as well as the operating position of rear derailleur 97*r*. Each optical sensor PHO-1 emits first pulses in response to rotation of a motor shaft, for example, in its corresponding motor, and each optical sensor PHO-2 emits second pulses in response to rotation of the motor shaft of its corresponding motor. The second pulses have a different phase from the first pulses. Thus, the gear positions of the derailleurs 97*f* and 97*r* can be detected by counting the number of these emitted pulses, and the rotational directions of the motors 97*fm* and 97*rm*, and thereby the gear shift directions, can be detected based on which of the two optical sensors PHO-1 and PHO-2 outputs a pulse first.

Figure 7:
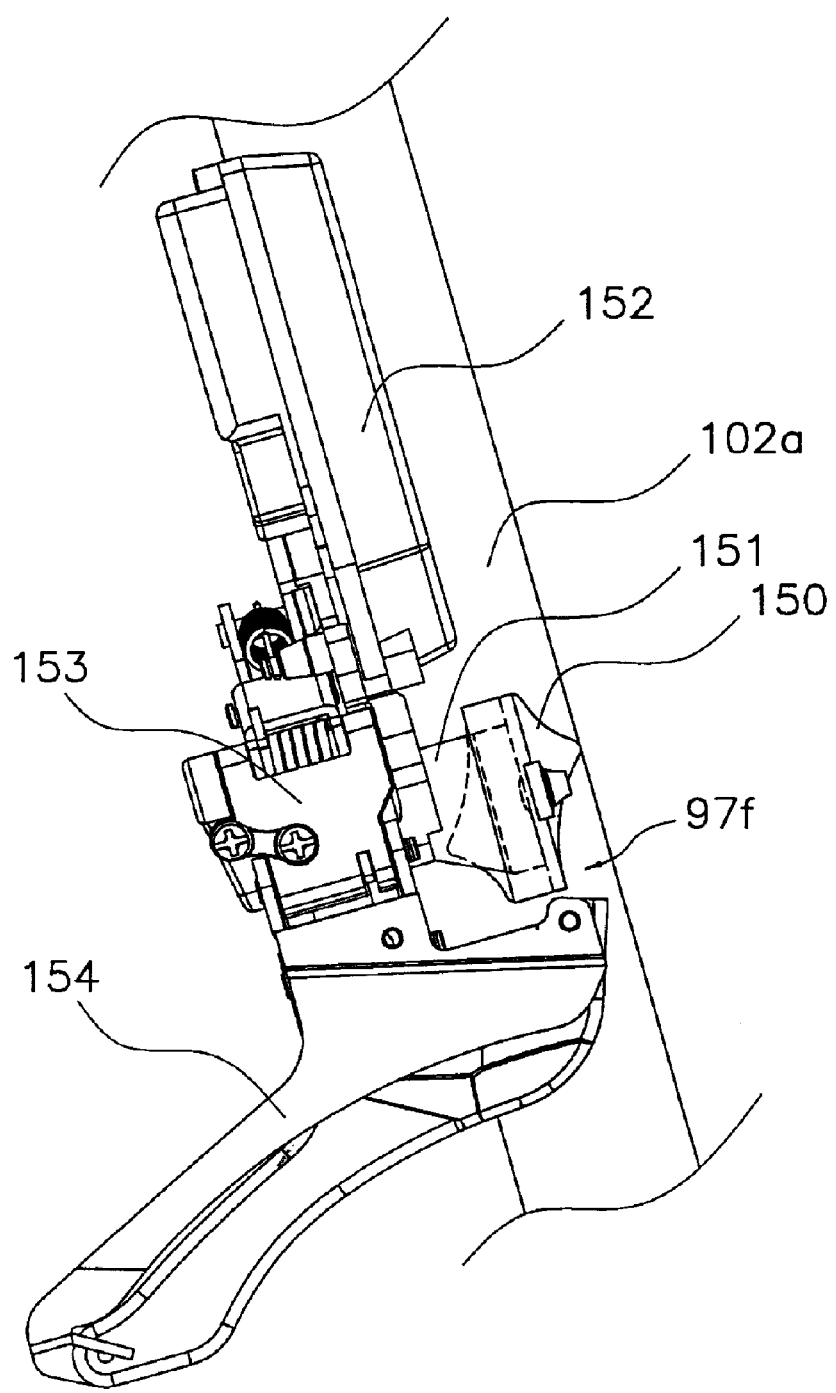
FIG. 7 is a detailed view of a particular embodiment of a front derailleur.

As shown in FIG. 7, front derailleur 97*f* comprises a mounting member 150 for attaching front derailleur to seat tube 102*a*, a bracket 151 attached to mounting member 150, a motor drive 152 mounted to bracket 151 for housing rear derailleur motor 97*fm*, a deceleration mechanism (not shown) and front gear position sensor 133*f*, a link mechanism 153 pivotably connected to bracket 151, and a chain guide 154 pivotably mounted to link mechanism 153. Chain guide 154 moves laterally relative to bracket 151 in accordance with the operation of front derailleur motor 97*fm* to switch chain 95 between front sprockets F1 and F2.

Figure 8:
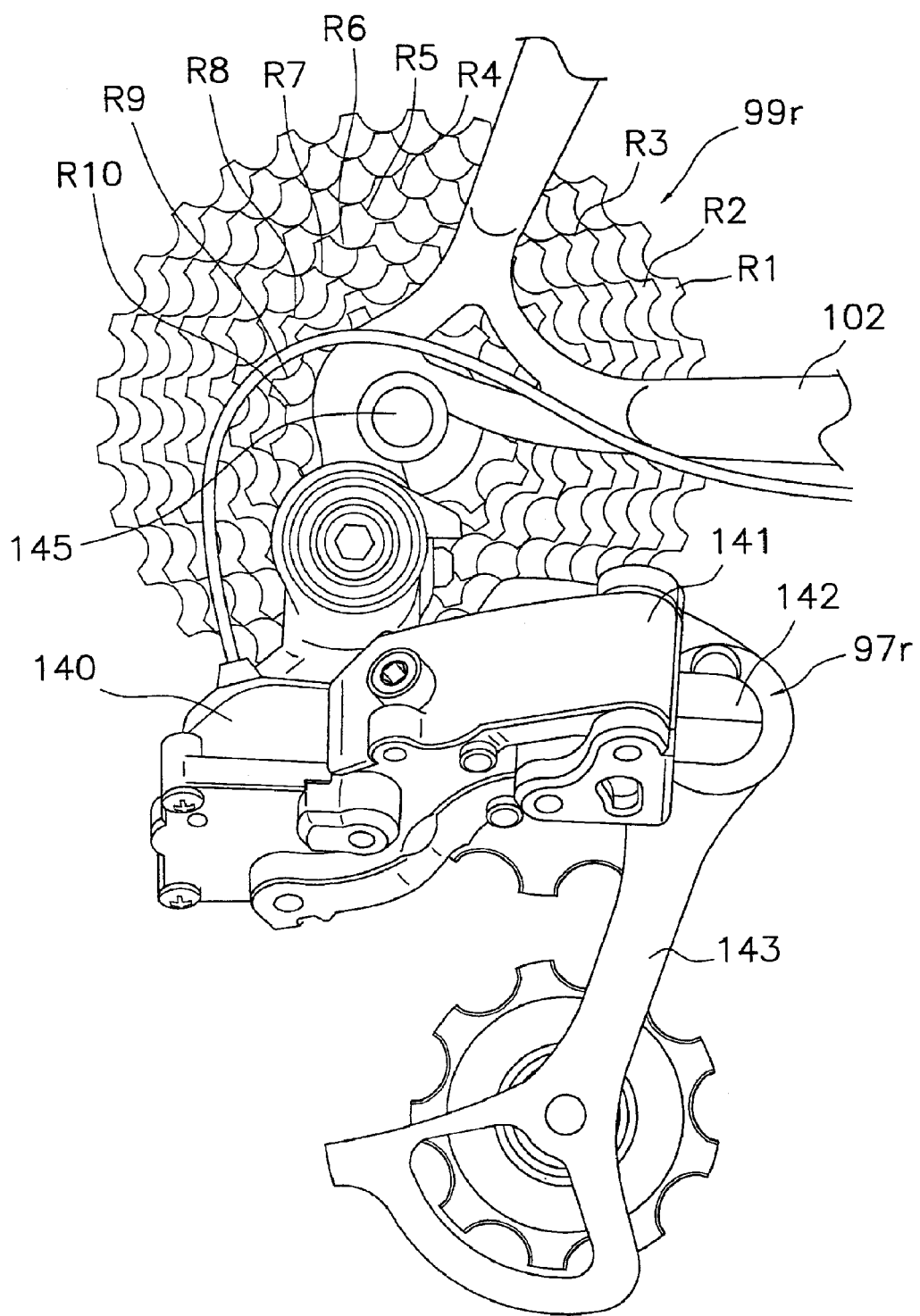
FIG. 8 is a detailed view of a particular embodiment of a rear derailleur.

As shown in FIG. 8, rear derailleur 97*r* comprises a base member 140 that houses a rear derailleur motor 97*rm*, a deceleration mechanism (not shown) and rear gear position sensor 133*r*, a link mechanism 141 pivotably connected to base member 140, and a movable member 142 pivotably mounted to link mechanism 141. Movable member 142 moves laterally relative to base member 140 in accordance with the operation of rear derailleur motor 97*rm*. Movable member 142 pivotably supports a chain guide 143 so that lateral movement of movable member 142 switches chain 95 among rear sprockets R1-R10.

Figure 2:
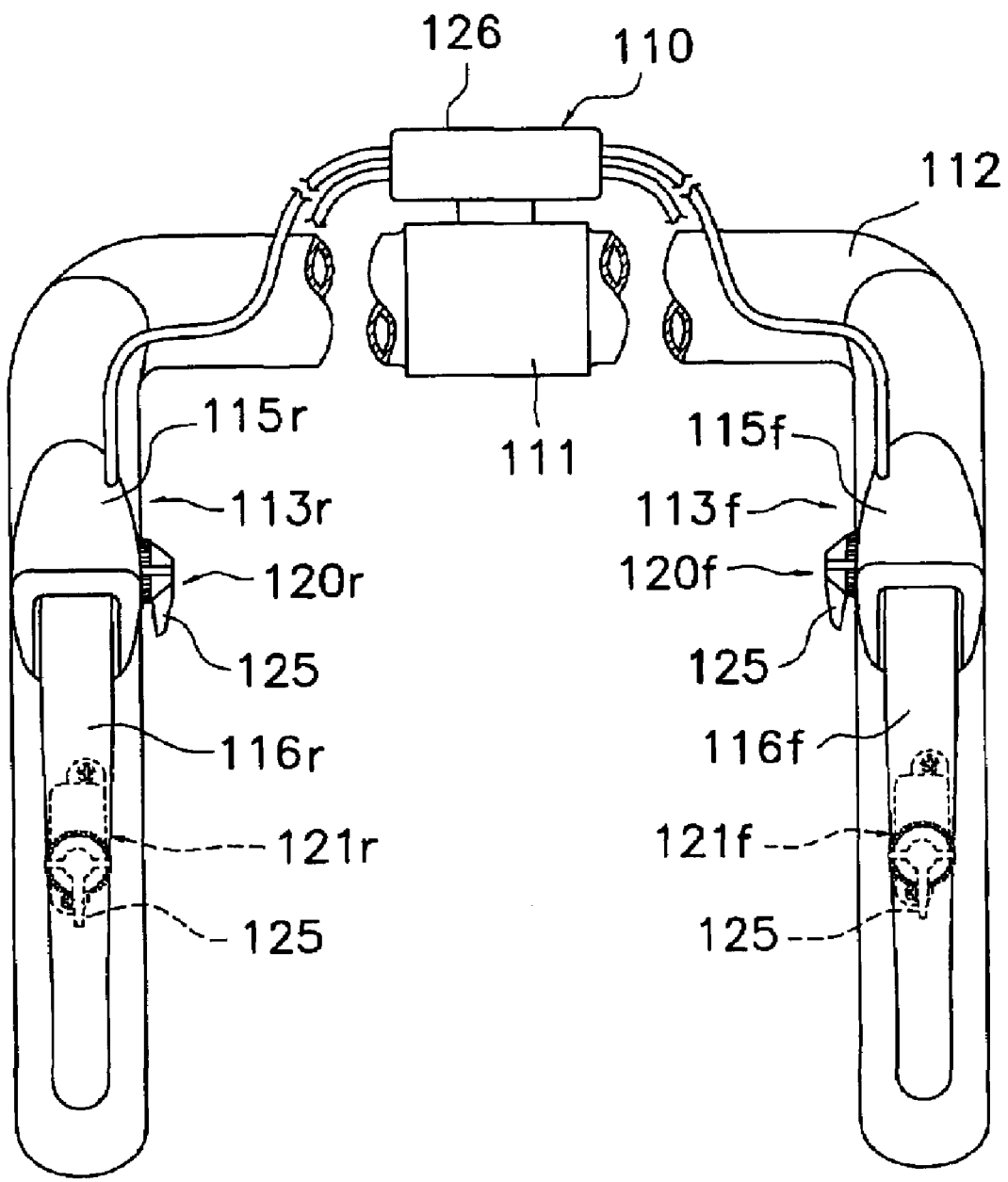
FIG. 2 is a front view of particular embodiments of brake lever assemblies mounted to the bicycle handlebar.

As shown in FIG. 1, handlebar assembly 104 comprises a handlebar stem 111 and a drop-style handlebar 112, wherein handlebar stem 111 is mounted to the upper part of fork 98, and handlebar 112 is mounted to the forward end portion of handlebar stem 111. As shown in FIG. 2, brake lever assemblies 113*f* and 113*r* are mounted at opposite sides of handlebar 112. Brake lever assembly 113*f* controls the operation of front wheel brake 107*f*, and brake lever assembly 113*r* controls the operation of rear wheel brake 107*r*. A derailleur control device 110 is mounted to a central portion of handlebar 112.

Figure 3:
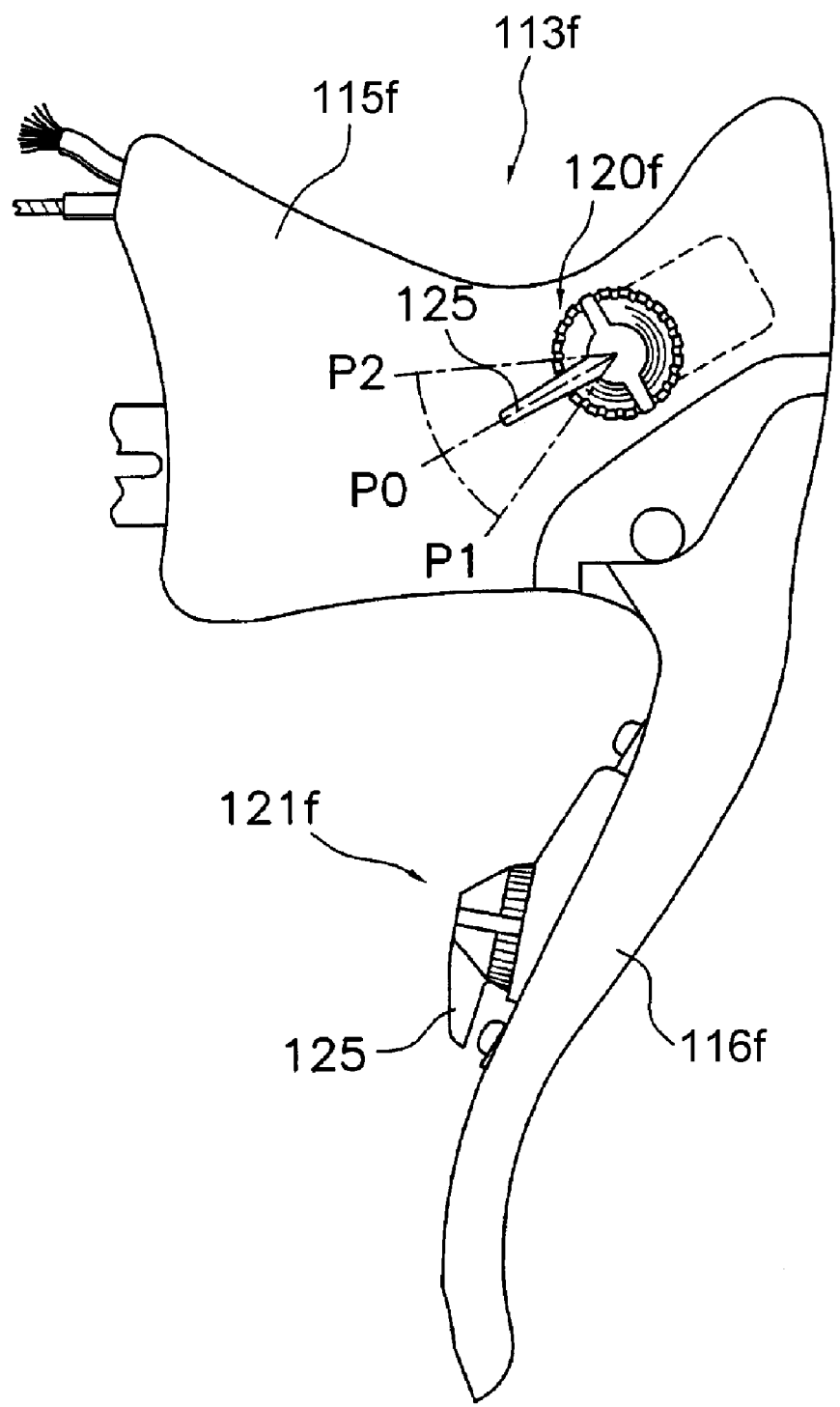
FIG. 3 is a side view of the front brake lever assembly.
Figure 4:
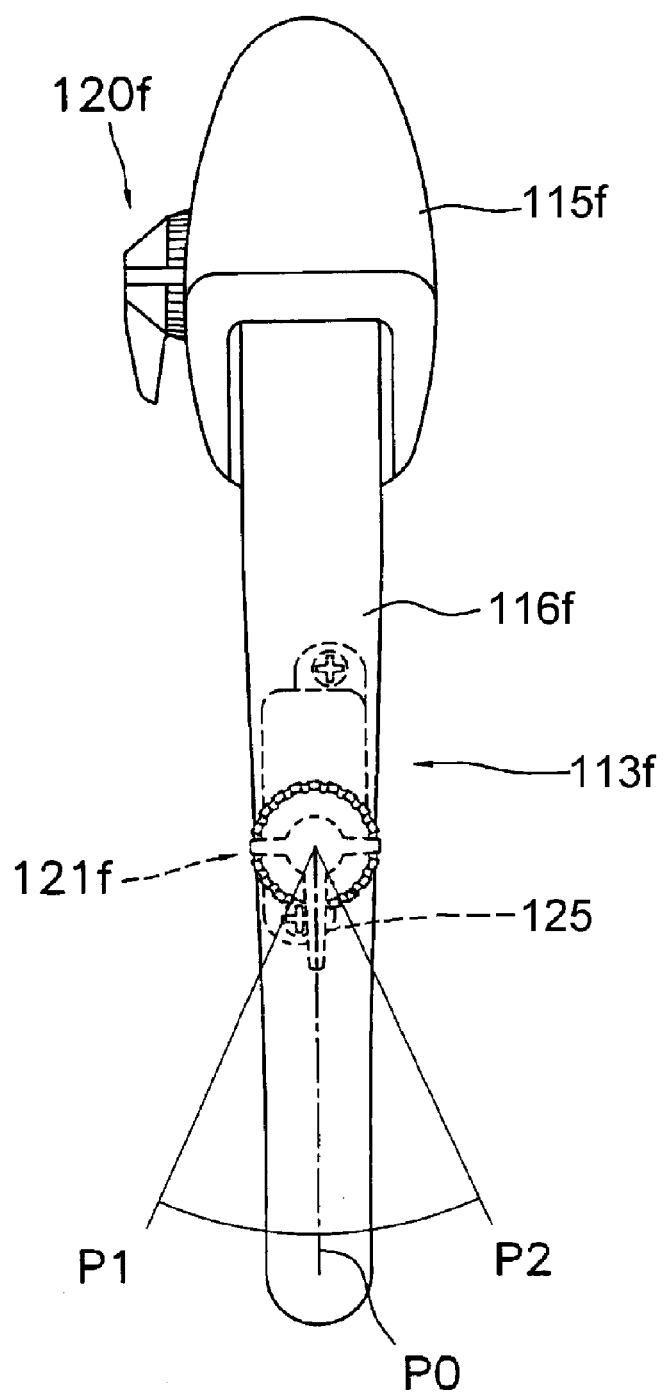
FIG. 4 is a front view of the front brake lever assembly.

Brake lever assemblies 113*f* and 113*r* comprise respective brake brackets 115*f* and 115*r* mounted to the forward curved portions of handlebar 112, and brake levers 116*f* and 116*r* pivotably mounted to brake brackets 115*f* and 115*r*. Front shift control devices 120*f* and 121*f* with switch levers 125 are mounted to the inner side of brake bracket 115*f* and to the rear side of brake lever 116*f*, respectively, to control the operation of front derailleur 97*f*. In this embodiment, front shift control devices 120*f* and 121*f* independently control the operation of front derailleur 97*f* so that the rider may control the operation of front derailleur 97*f* with the hand grasping brake bracket 115*f* or with the hand grasping brake lever 116*f*. As shown in FIG. 3, the switch lever 125 mounted to brake lever bracket 115*f* rotates downward from a home position P0 to a first position P1 and rotates upward from home position P0 to a second position P2 to control the operation of front derailleur 97*f*. As shown in FIG. 4, the switch lever 125 mounted to the rear of brake lever 116*f* rotates laterally inward from a home position P0 to a first position P1 and rotates laterally outward from home position P0 to a second position P2 to control the operation of front derailleur 97*f*. Similarly, independent rear shift control devices 120*r* and 121*r* with switch levers 125 are mounted to the inner side of brake bracket 115*r* and to the rear side of brake lever 116*r*, respectively, to control the operation of rear derailleur 97*r*. The switch levers 125 mounted to brake lever bracket 115*r* and brake lever 116*r* operate in the same manner as switch levers 125 mounted to brake lever bracket 115*f* and brake lever 116*f*. All of the switch levers 125 are biased toward the home position P0.

A front upshift switch 131*f* (FIG. 6) and a front downshift switch 132*f* are mounted in each front shift control device 120*f* and 121*f*. The front upshift switches 131*f* operate when switch levers 125 in front shift control devices 120*f* and 121*f* rotate from position P0 to position P1, and the front downshift switches 132*f* operate when switch levers 125 in front shift control devices 120*f* and 121*f* rotate from position P0 to position P2. Similarly, a rear upshift switch 131*r* and a rear downshift switch 132*r* are mounted in each rear shift control device 120*r* and 121*r*. The rear upshift switches 131*r* operate when switch levers 125 in rear shift control devices 120*r* and 121*r* rotate from position P0 to position P1, and the rear downshift switches 132*r* operate when switch levers 125 in rear shift control devices 120*r* and 121*r* rotate from position P0 to position P2. Of course, many different switch combinations that operate in many different ways may be provided to suit different applications.

Figure 6:
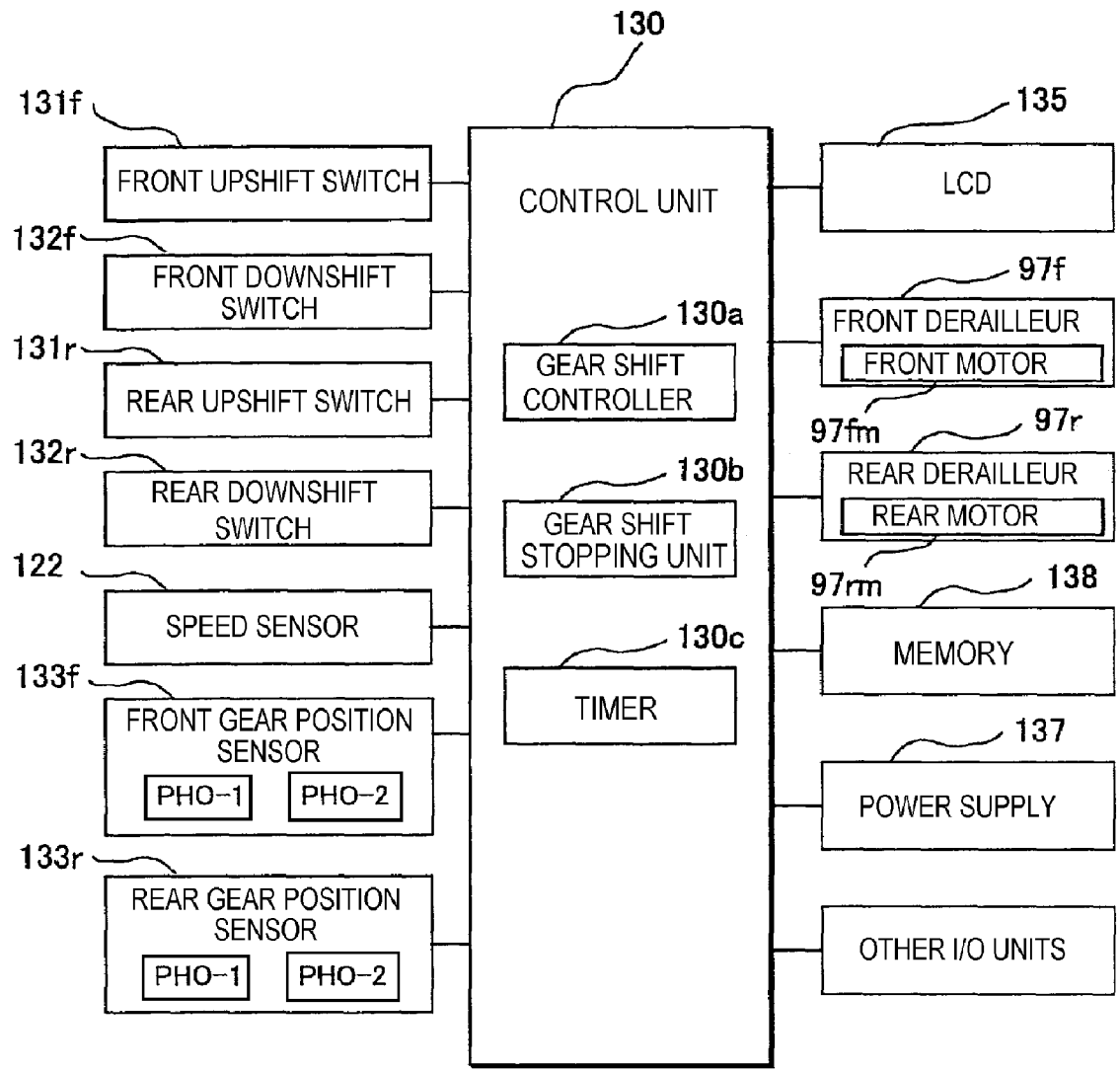
FIG. 6 is a schematic block diagram of a particular embodiment of a derailleur control apparatus.

As shown in FIGS. 2 and 6, derailleur control device 110 comprises a case 126 mounted onto the central portion of handlebar 112. Mounted within case 126 are a control unit 130 and a liquid crystal display (LCD) 135 for displaying riding parameters and other information. Front derailleur 97*f* with front derailleur motor 97*fm*, rear derailleur 97*r* with rear derailleur motor 97*rm*, front upshift switch 131*f*, front downshift switch 132*f*, rear upshift switch 131*r*, rear downshift switch 132*r*, front gear position sensor 133*f*, rear gear position sensor 133*r* and other I/O units are connected to control unit 130 through appropriate methods such as wired or wireless devices. A storage unit such as a memory 138 stores various parameters used in the operation of control unit 130. For example, the operating (sprocket) positions (FP, RP) based on the front sprockets FS (S=1, 2) and rear sprockets RS (S=1-10) for the front and rear derailleurs 97*f* and 97*r* are stored in accordance with values detected by gear position sensors 133*f* and 133*r*. As shown in FIGS. 1 and 6, a speed sensor 122 is mounted to fork 98 to sense the passage of a magnet 123 mounted to a spoke 106*s* of front wheel 106*s* and to provide speed indicating signals to control unit 130. A battery or some other power supply 137 powers control unit 130, front and rear derailleurs 97*f* and 97*r*, and other electrical components described herein in a known manner.

In this embodiment, control unit 130 comprises a programmed microprocessor. Control unit 130 includes a gear shift controller 130*a*, a gear shift stopping unit 130*b* and a timer 130*c*. Gear shift controller 130*a* controls the operation of front derailleur 97*f* and rear derailleur 97*r* to shift chain 95 the distance from an origin sprocket to a destination sprocket in accordance with signals received from front and rear upshift switches 131f and 131r, front and rear downshift switches 132f and 132r, and front and rear gear position sensors 133f and 133r. Control unit 130 also displays speed, gear positions, and running distance on LCD 135 based on signals received from speed sensor 122 and gear position sensors 133f and 133r. Gear shift stopping unit 130b provides signals to gear shift controller 130a to stop a gear shift operation if gear shift stopping unit 130b is unable to detect, during the gear shift operation, rotation of front derailleur motor 97fm.

Figure 10A:
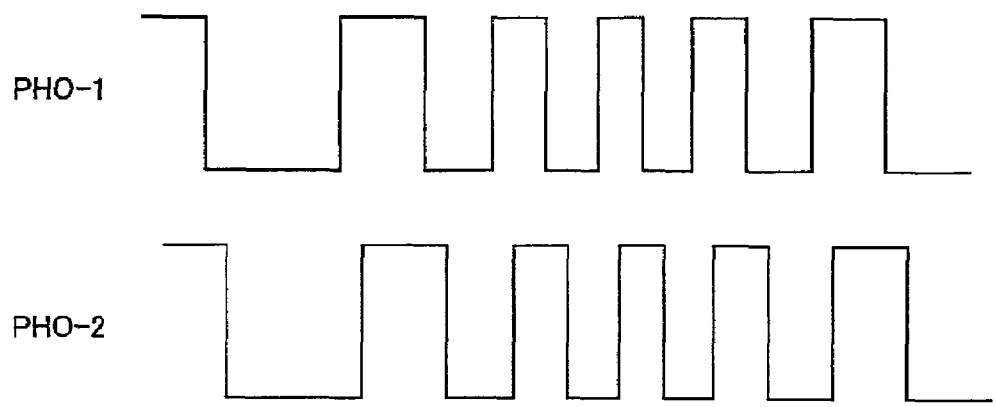
FIG. 10A is a timing diagram of the operation of a motion sensor during a normal gear shift operation.
Figure 10B:
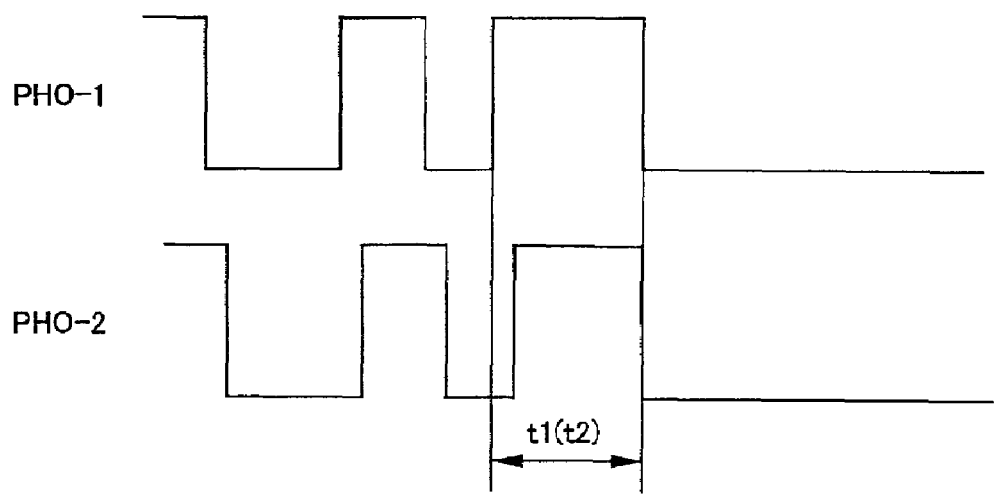
FIG. 10B is a timing diagram of the operation of a motion sensor during an abnormal gear shift operation.

FIG. 10A is a timing diagram of the operation of optical sensors PHO-1 and PHO-2 in front gear position sensor 133f during a normal gear shift operation, whereas FIG. 10B is a timing diagram of the operation of optical sensors PHO-1 and PHO-2 in front gear position sensor 133f during an abnormal gear shift operation, such as when the bicycle is not being pedaled and front derailleur 97f encounters significant resistance while attempting to shift chain 95 from one front sprocket to another. If a pulse change is not detected for a time interval t1 or t2 measured by timer 130c, then gear shift stopping unit 130b may provide a signal to gear shift controller 130a to stop the current gear shift operation. Time intervals t1 and t2 may represent time intervals for upshifting and downshifting operations of front derailleur 97f, respectively. Each time interval t1 and t2 may be set to a value less than a maximum time needed to complete a gear shift operation (e.g., less than 100 milliseconds). A typical value for time interval t1 may be in a range of from approximately 50 milliseconds to approximately 80 milliseconds, such as 60 milliseconds. Gear shift controller 130a also controls front motor 97fm such that, after the gear shift operation has been stopped, chain guide 154 of front derailleur 97f returns to the original gear position prior to the attempted gear shift operation. Because chain guide 154 returns to the original gear position, gear shifting can be resumed smoothly after being stopped.

Figure 9A:
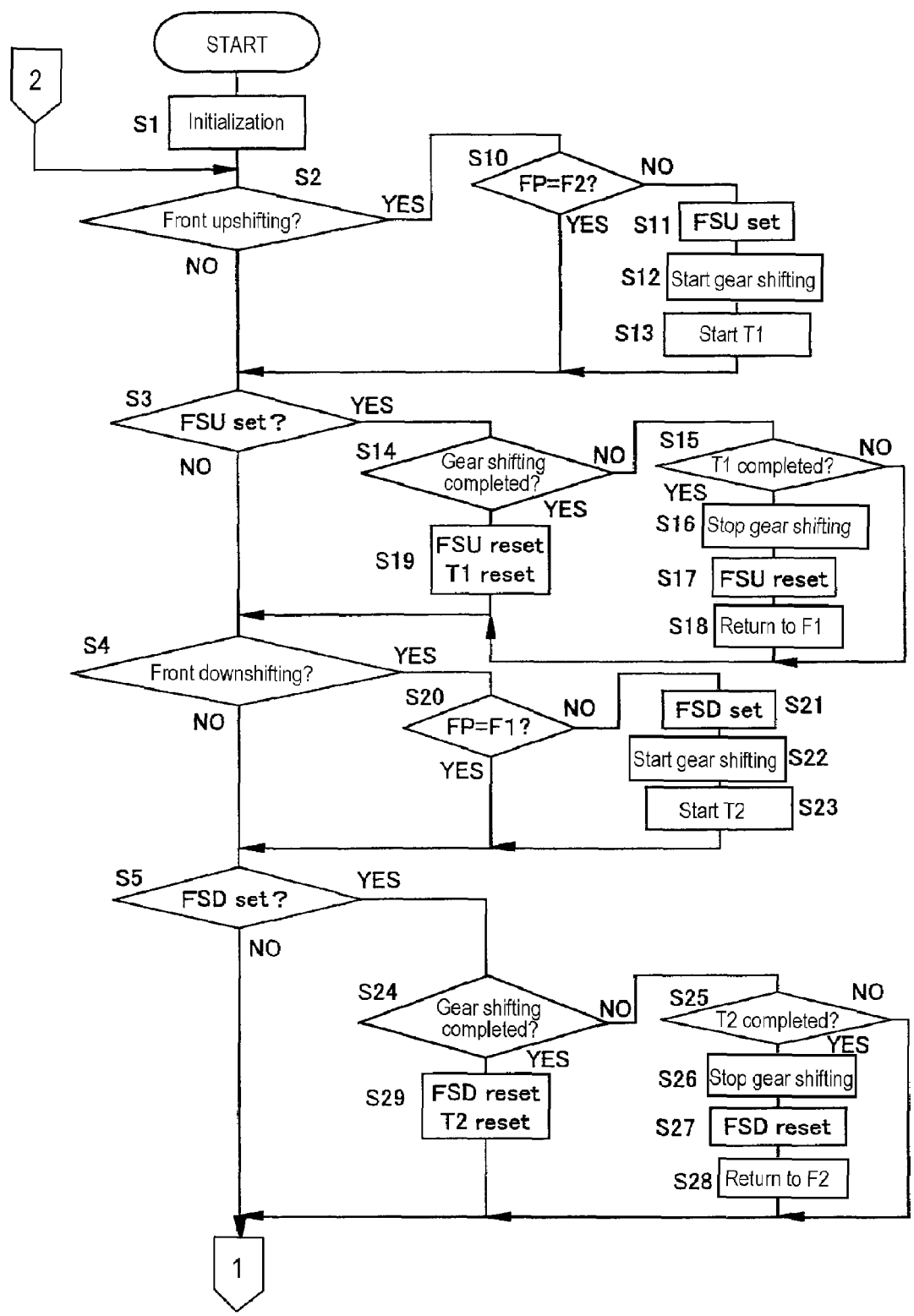
FIGS. 9A and 9B provide a flow chart of a particular embodiment of the operation of the derailleur control apparatus.
Figure 9B:
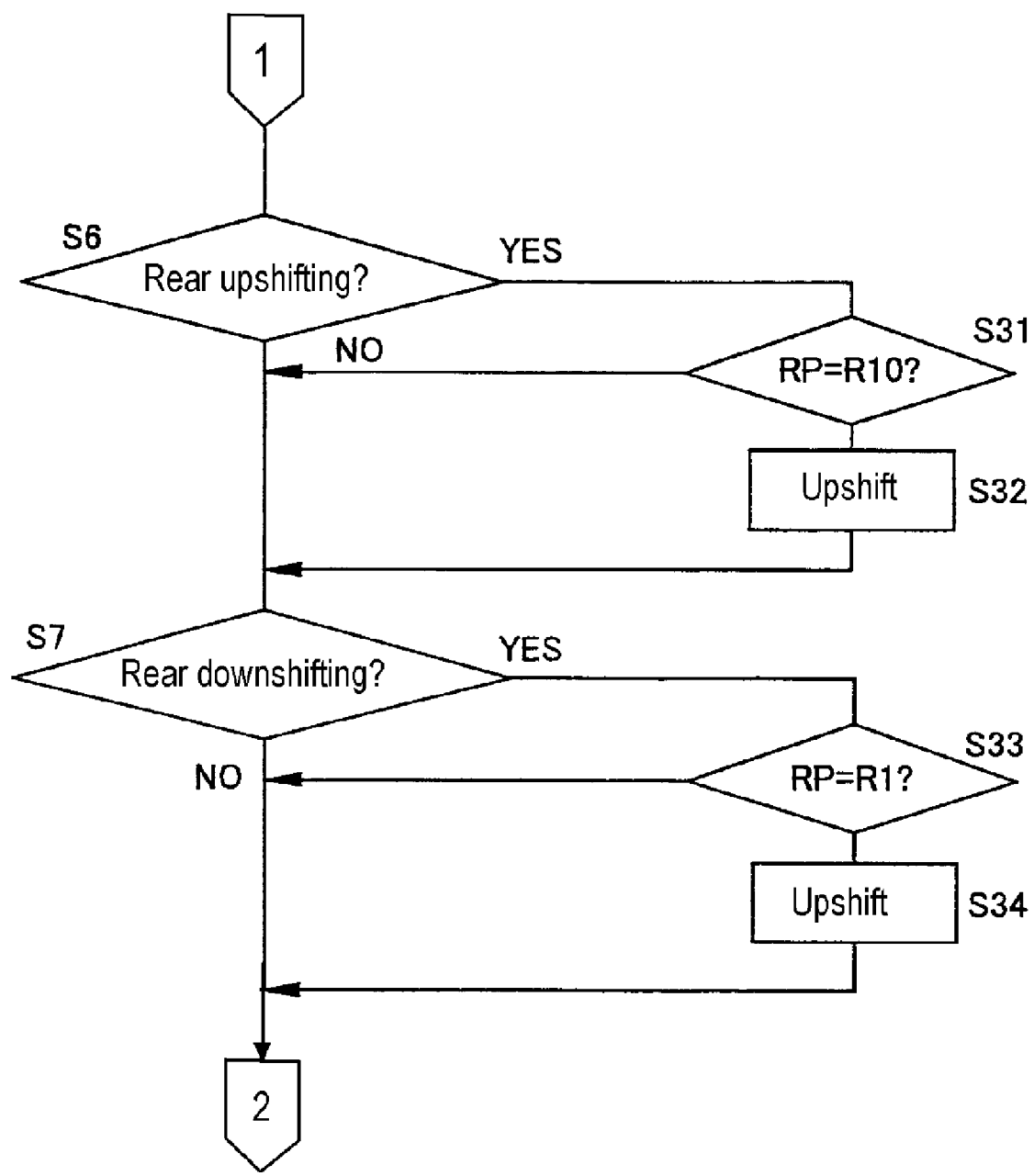

FIGS. 9A and 9B provide a flow chart of a particular embodiment of the operation of control unit 130. Initialization is carried out in a step S1 when power is supplied to control unit 130. In this step, various flags and variables are reset and operating positions (FP, RP) are set to predetermined values and stored in memory 138. It is then determined in a step S2 whether or not a front upshift switch 131f has been turned on as a result of a switch lever 125 in front shift control device 120f or 121f rotating from position P0 to position P1. If so, it is then determined in a step S10 whether or not front derailleur 97f currently is at the operating position for sprocket F2 based on signals from front gear position sensor 133f. If so, then no further upshifting is possible, the upshift request is ignored, and processing continues at a step S3. Otherwise, a front upshift flag FSU is set in a step S11, gear shift controller 130a provides a signal to start front derailleur motor 97fm in a step S12 so that front derailleur 97f begins to switch chain 95 from sprocket F1 to sprocket F2, and a timer T1, which is a component of timer 130c used to measure the time interval t1, is started in a step S13. In this embodiment, front upshift flag FSU is set at the beginning of the shift control operation and is reset at the end of the shift control operation. In other words, front upshift flag FSU indicates a pending upshift operation.

In any event, it is then determined in step S3 whether or not front upshift flag FSU has been set. If so, it is then determined in a step S14 whether or not the gear shift operation has completed (i.e., chain guide 154 is positioned at front sprocket F2) based on the output from front gear position sensor 133f and the data stored in memory 138. If so, then front upshift flag FSU and timer T1 both are reset in a step S19, and processing continues at step S4. On the other hand, if the gear shift operation has not yet completed, it is then determined in a step S15 whether or not timer T1 has completed measuring the selected time interval t1. If so, then gear shift stopping unit 130b provides one or more signals to gear shift controller 130a to stop the gear shift operation in a step S16 (whereupon gear shift controller 130a stops the supply of power to front derailleur motor 97fm), front upshift flag FSU is reset in a step S17, and then gear shift controller 130a controls the supply of power to move front derailleur motor 97fm in the reverse direction in a step S18 to return chain guide 154 to the position for front sprocket F1, thereby preventing the wasteful use of power supply 137. Processing then continues at step S4.

It is then determined in step S4 whether or not a front downshift switch 132f has been turned on as a result of a switch lever 125 in front shift control device 120f or 121f rotating from position P0 to position P2. If so, it is then determined in a step S20 whether or not front derailleur 97f currently is at the operating position for sprocket F1. If so, then no further downshifting is possible, the downshift request is ignored, and processing continues at step S5. Otherwise, a front downshift flag FSD is set in a step S21, gear shift controller 130a provides a signal to start front derailleur motor 97fm in a step S22 so that front derailleur 97f begins to switch chain 95 from sprocket F2 to sprocket F1, and a timer T2, which is a component of timer 130c used to measure the time interval t2, is started in a step S23. In this embodiment, time interval t2 set for downshifting is shorter than the time period t1 set for upshifting because front derailleur 97f takes less time to perform downshifting than it does to perform upshifting. Thus, if time interval t1 for upshifting is set to 60 milliseconds, then time interval t2 for downshifting may be set to approximately 50 milliseconds, for example. As with front upshift flag FSU, front downshift flag FSD is set at the beginning of the shift control operation and is set at the end of the shift control operation. In other words, front downshift flag FSD indicates a pending downshift operation.

In any event, it is then determined in step S5 whether or not front downshift flag FSD has been set. If so, it is then determined in a step S24 whether or not the gear shift operation has completed (i.e., chain guide 154 is positioned at front sprocket F1). If so, then front downshift flag FSD and timer T2 both are reset in a step S29, and processing continues at step S6 in FIG. 9B. On the other hand, if the gear shift operation has not yet completed, it is then determined in a step S25 whether or not timer T2 has completed measuring the selected time interval t2. If so, then gear shift stopping unit 130b provides one or more signals to gear shift controller 130a to stop the gear shift operation in a step S26 (whereupon gear shift controller 130a stops the supply of power to front derailleur motor 97fm), front downshift flag FSU is reset in a step S27, and gear shift controller 130a controls the supply of power to move front derailleur motor 97fm in the reverse direction in a step S28 to return chain guide 154 to the position for front sprocket F2, thereby preventing the wasteful use of power supply 137. Processing then continues at step S6 in FIG. 9B.

It is then determined in step S6 whether or not a rear upshift switch 131r has been turned on as a result of a switch lever 125 in rear shift control device 120r or 121r rotating from position P0 to position P1. If so, it is then determined in a step S31 whether or not rear derailleur 97r currently is at the operating position for sprocket R10 based on signals from rear gear position sensor 133r. If so, then no further upshifting is possible, the upshift request is ignored, and processing continues at a step S7. Otherwise, gear shift controller 130*a* controls the supply of power to rear derailleur motor 97*rm* in a step S32 so that rear derailleur 97*r* switches chain 95 to the next higher rear sprocket.

In any event, it is then determined in step S7 whether or not a rear downshift switch 132*r* has been turned on as a result of a switch lever 125 in rear shift control device 120*r* or 121*r* rotating from position P0 to position P2. If so, it is then determined in a step S33 whether or not rear derailleur 97*r* currently is at the operating position for sprocket R1. If so, then no further downshifting is possible, the downshift request is ignored, and processing returns to step S2 in FIG. 9A. Otherwise, gear shift controller 130*a* controls the supply of power to rear derailleur motor 97*rm* in a step S34 so that rear derailleur 97*r* switches chain 95 to the next lower rear sprocket. Processing then returns to step S2 in FIG. 9A.

Figure 12:
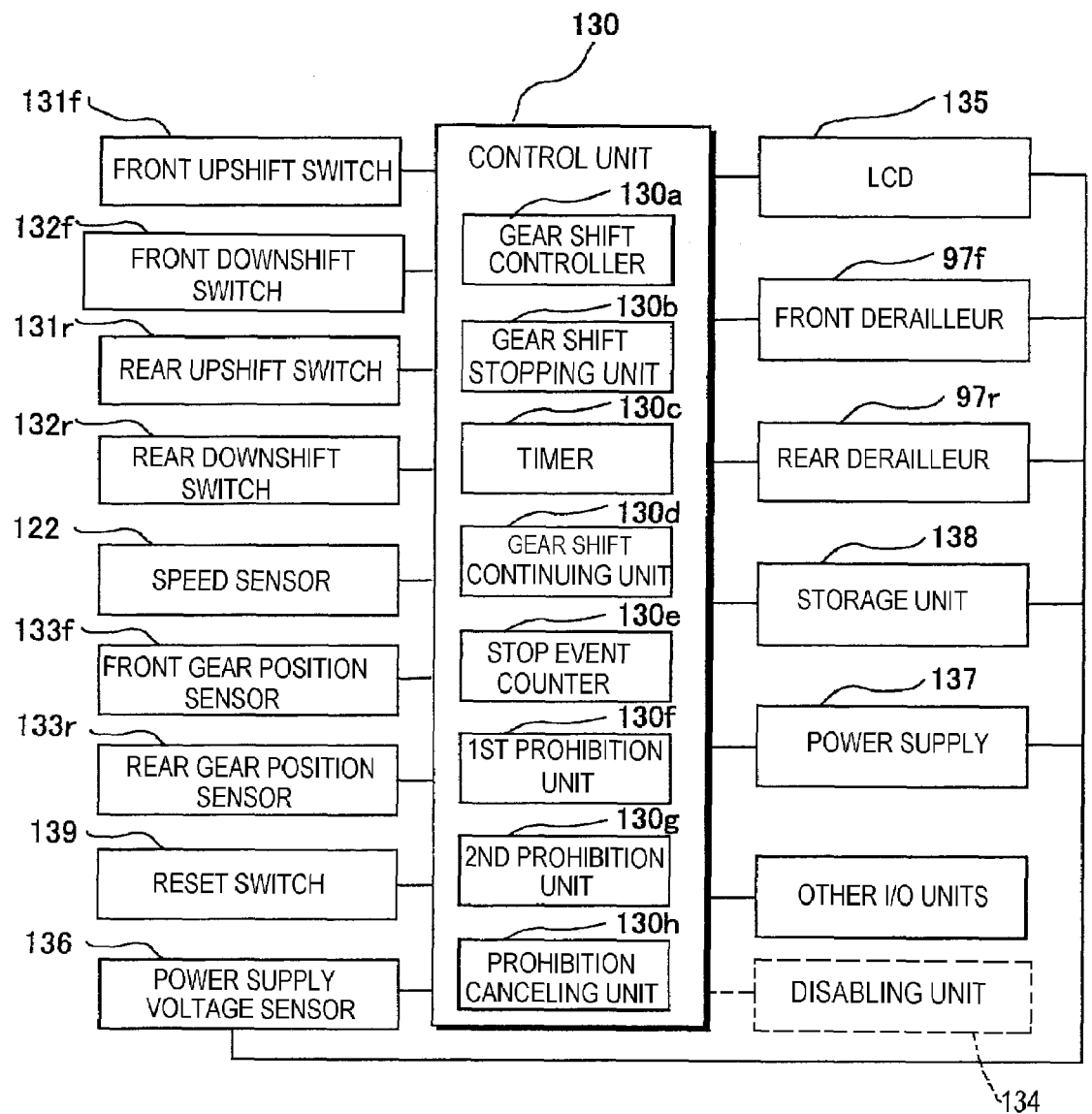
FIG. 12 is a schematic block diagram of another embodiment of a derailleur control apparatus.

In the embodiment described above, gear shift controller 130*a* controlled the supply of power to move front derailleur motor 97*fm* in the reverse direction to return chain guide 154 to the original front sprocket F1 or F2 immediately in response to a single detection of an abnormal gear shift operation. FIG. 12 is a schematic block diagram of another embodiment of a derailleur control apparatus, wherein multiple attempts may be made to successfully shift front derailleur 97*f* from an origin front sprocket to a destination front sprocket before aborting the gear shift operation. Once the gear shift operation is aborted, the derailleur control apparatus may prohibit any further gear shift attempt until the prohibition is canceled.

In FIG. 12, components that are the same as the components described in the first embodiment are numbered the same and are not described in detail. As shown in FIG. 12, control unit 130 further includes a gear shift continuing unit 130*d* that provides signals for retrying a gear shift operation after a time interval t3 (FIG. 14B) has elapsed from a previously stopped gear shift operation, a stop event counter 130*e* for counting a number of times a gear shift operation has been stopped by gear shift stopping unit 130*b*, a first prohibition unit 130*f* for providing signals that prohibit further gear shift operations when the number of stopped gear shift operations passes a selected value, a second prohibition unit 130*g* for providing signals that prohibit further gear shift operations when power supply 137 has a selected characteristic, and a prohibition canceling unit 130*h* for providing signals to cancel a previously established prohibition. The optical sensors and derailleur motors shown in FIG. 6 have been omitted for convenience, but those components still exist in this embodiment.

Figure 14A:
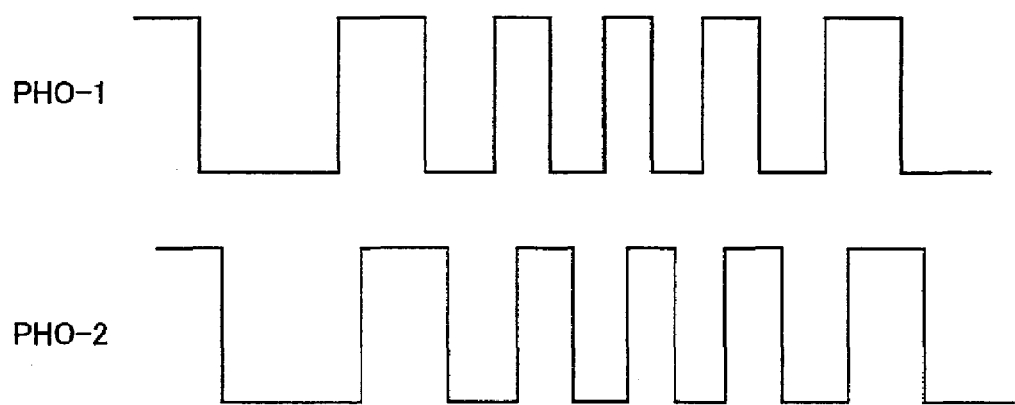
FIG. 14A is a timing diagram of the operation of a motion sensor during a normal gear shift operation for the embodiment shown in FIG. 12.
Figure 14B:
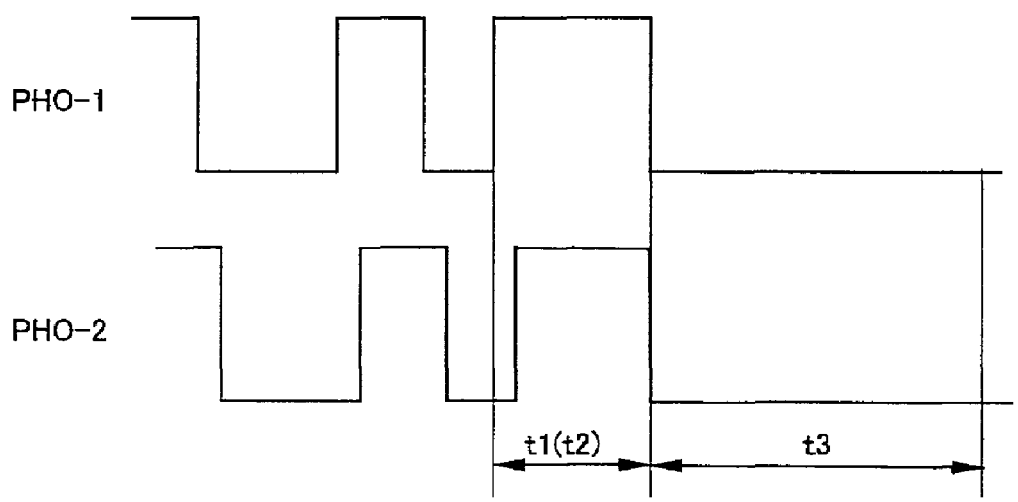
FIG. 14B is a timing diagram of the operation of a motion sensor during an abnormal gear shift operation for the embodiment shown in FIG. 12.

FIG. 14A is a timing diagram of the operation of optical sensors PHO-1 and PHO-2 in front gear position sensor 133*f* during a normal gear shift operation, whereas FIG. 14B is a timing diagram of the operation of optical sensors PHO-1 and PHO-2 in front gear position sensor 133*f* during an abnormal gear shift operation, such as when the bicycle is not being pedaled and front derailleur 97*f* encounters significant resistance while attempting to shift chain 95 from one front sprocket to another. As in the first embodiment, if a pulse change is not detected for a time interval t1 or t2 measured by timer 130*c*, then gear shift stopping unit 130*b* may provide a signal to gear shift controller 130*a* to stop the current gear shift operation. Once again, time intervals t1 and t2 may represent time intervals for upshifting and downshifting operations of front derailleur 97*f*, respectively. In this embodiment, time interval t3 is measured from the time the gear shift operation is stopped. Time interval t3 may have a value of from approximately 200 milliseconds to approximately 300 milliseconds, such as 250 milliseconds.

Second prohibition unit 130*g* operates in response to signals received from a power supply voltage sensor 136 that senses a voltage of power supply 137. In this embodiment, second prohibition unit 130*g* provides signals that prohibit further gear shift operations when a voltage of power supply 137 is below a selected value (e.g., 3.5 volts).

Figure 11:
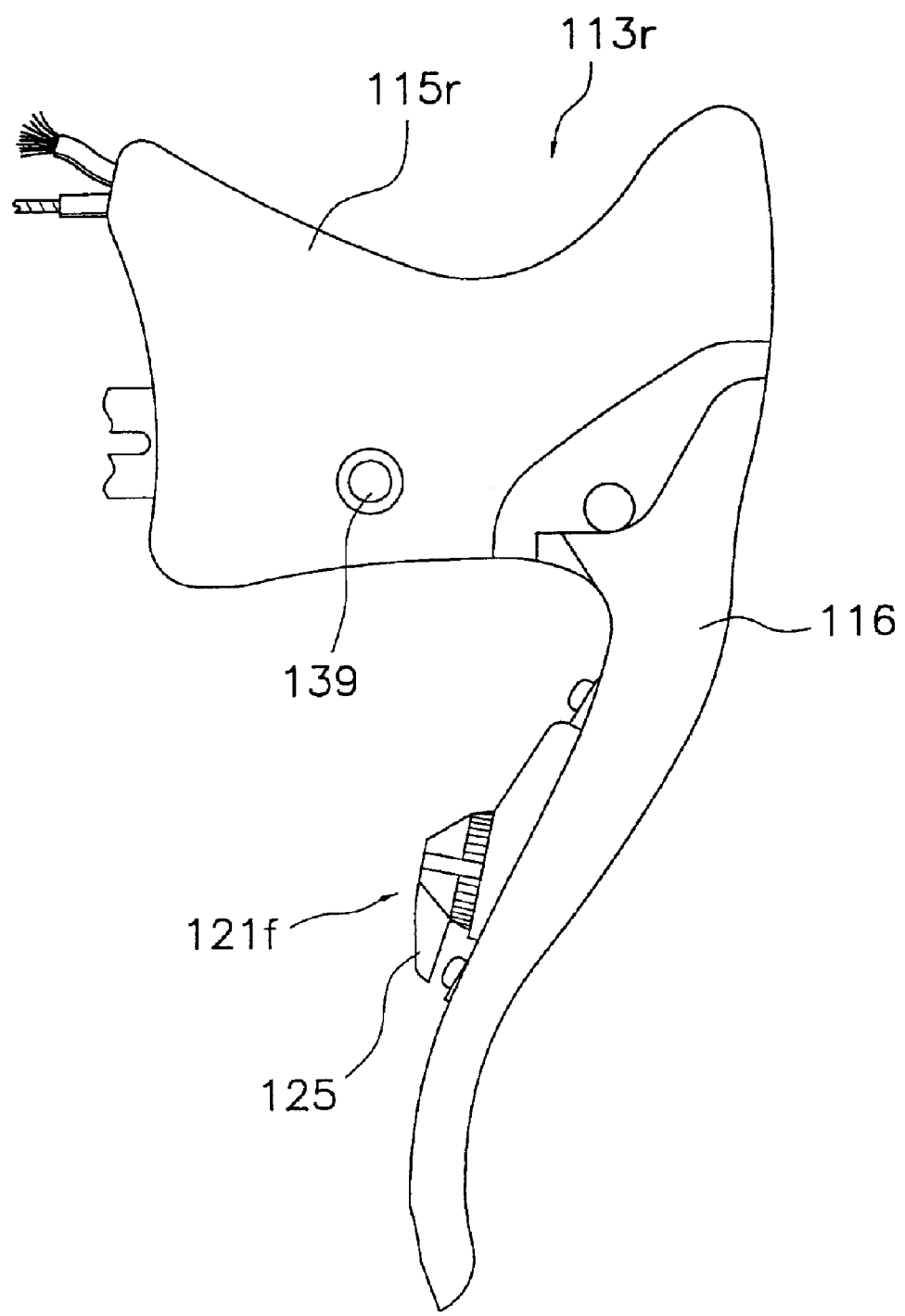
FIG. 11 is a side view of an alternative embodiment of a front brake lever assembly.

Prohibition canceling unit 130*h* operates in response to signals received from a reset switch 139 that may be manually operated by the rider. In this embodiment, as shown in FIG. 11, reset switch 139 may have the form of a push button switch mounted to an inner side of brake lever bracket 115*f* of front brake lever assembly 113*f*.

Figure 13A:
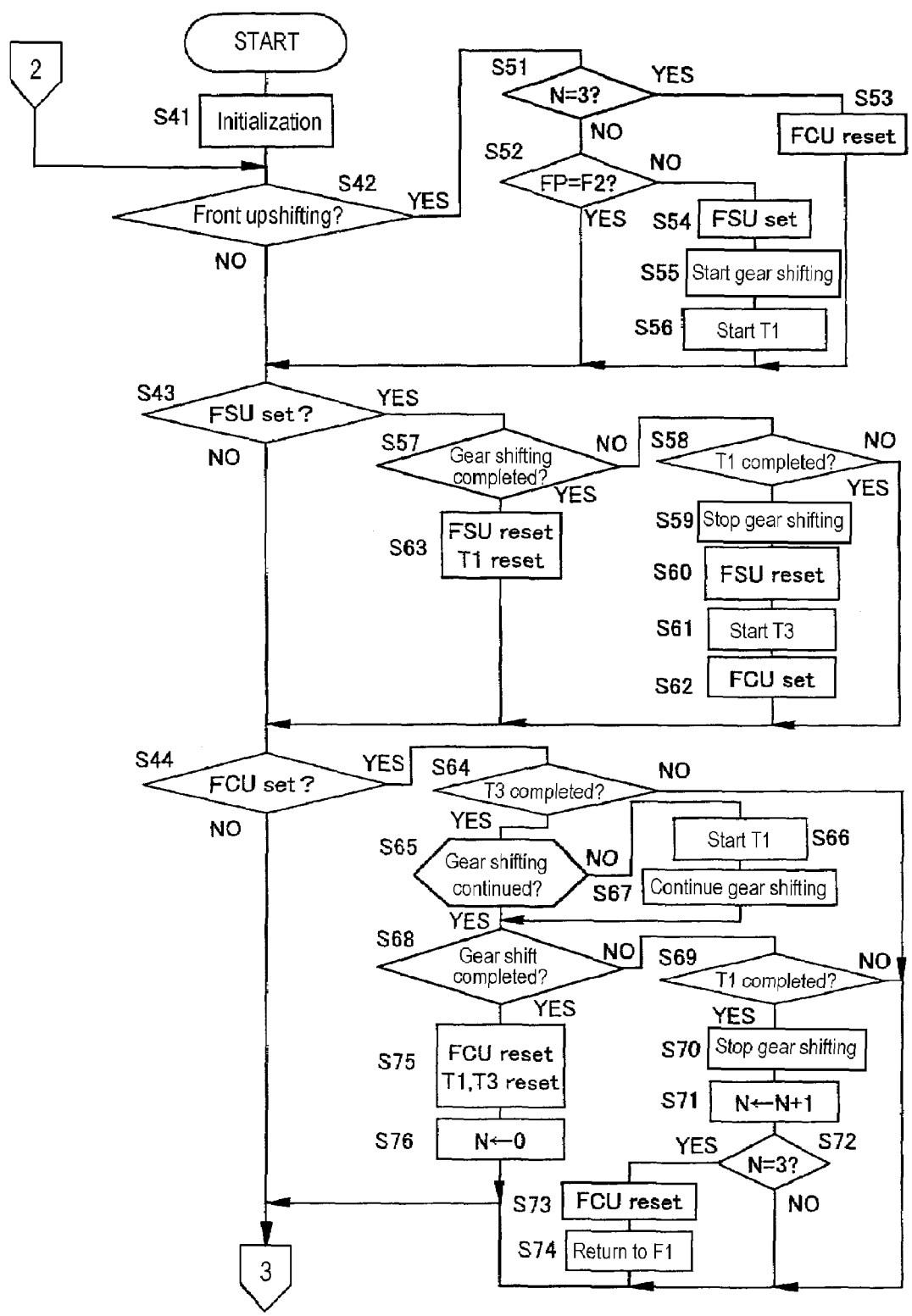
FIGS. 13A and 13B provide a flow chart of a particular embodiment of the operation of the derailleur control apparatus shown in FIG. 12.
Figure 13B:
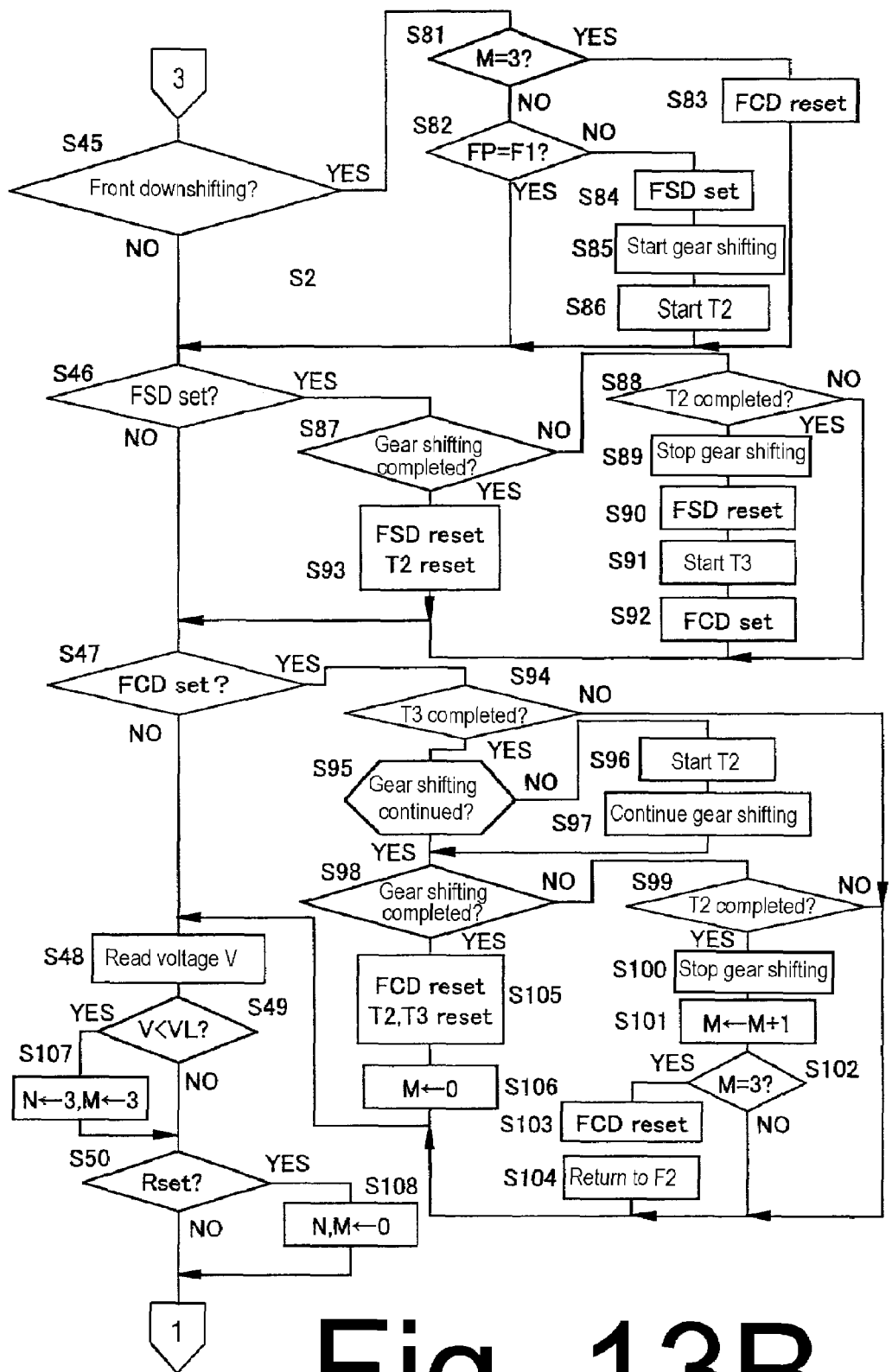

FIGS. 13A and 13B provide a flow chart of a particular embodiment of the operation of control unit 130 shown in FIG. 12. Initialization is carried out in a step S41 when power is supplied to control unit 130. In this step, as in the first embodiment, various flags and variables are reset and operating positions (FP, RP) are set to predetermined values and stored in memory 138. It is then determined in a step S42 whether or not a front upshift switch 131*f* has been turned on as a result of a switch lever 125 in front shift control device 120*f* or 121*f* rotating from position P0 to position P1. If so, it is then determined in a step S51 whether or not a value N stored in stop event counter 130*e* is equal to three. In this embodiment, gear shift controller 130*b* will retry the upshift operation three times before first prohibition unit 130*f* provides signals to prevent any further upshift attempts. Thus, if the value stored in stop event counter 130*e* is equal to three, a front continue upshift flag FCU is reset in a step S53, and the process continues at a step S43. As a result, if a particular upshift operation has been stopped three times, further gear shift operations are prohibited even if an upshift operation command is subsequently issued.

On the other hand, if the value N stored in stop event counter 130*e* is not equal to three, it is then determined in a step S52 whether or not front derailleur 97*f* currently is at the operating position for sprocket F2 based on signals from front gear position sensor 133*f*. If so, then no further upshifting is possible, the upshift request is ignored, and processing continues at step S43. Otherwise, front upshift flag FSU is set in a step S54, gear shift controller 130*a* provides a signal to start front derailleur motor 97*fm* in a step S55 so that front derailleur 97*f* begins to switch chain 95 from sprocket F1 to sprocket F2, and timer T1 is started in a step S56.

In any event, it is then determined in step S43 whether or not front upshift flag FSU has been set. If so, it is then determined in a step S57 whether or not the gear shift operation has completed (i.e., chain guide 154 is positioned at front sprocket F2) based on the output from front gear position sensor 133*f* and the data stored in memory 138. If so, then front upshift flag FSU and timer T1 both are reset in a step S63, and processing continues at step S44. On the other hand, if the gear shift operation has not yet completed, it is then determined in a step S58 whether or not timer T1 has completed measuring the selected time interval t1. If not, then processing continues at step S44. If so, then gear shift stopping unit 130*b* provides one or more signals to gear shift controller 130*a* to stop the gear shift operation in a step S59 (whereupon gear shift controller 130*a* stops the supply of power to front derailleur motor 97*fm*), front upshift flag FSU is reset in a step S60, a timer T3, which is a component of timer 130*c* used to measure the time interval t3, is started in a step S61, and front continue upshift flag FCU is set in a step S62. Processing then continues at a step S44.

It is then determined in step S44 whether or not front continue upshift flag FCU is set. If so, it is then determined in a step S64 whether or not timer T3 has completed measuring the selected time interval t3. If not, then processing simply continues at step S45 in FIG. 13B. If timer T3 has completed measuring the selected time interval t3, then the previously stopped gear shift operation may be retried (continued). Accordingly, it is then determined in a step S65 whether or not the retry operation already is in process. If not, timer T1 is started in a step 66 and gear shift controller 130a continues the previously stopped gear shift operation. In any event, it is then determined in a step S68 whether or not the gear shift operation has completed. If so, then the front continue upshift flag FCU and timers T1 and T3 are reset in a step S75, the count value N in stop event counter 130e is set to zero, and processing continues at step S45 in FIG. 13b. However, if the gear shift operation has not completed, it is then determined in a step S69 whether or not timer T1 has completed measuring the selected time interval t1. If not, then processing simply continues at step S45 in FIG. 13B. Otherwise, gear shift stopping unit 130b provides signals to gear shift controller 130a to stop the gear shift operation in a step S70, the value N in stop event counter 130e is incremented by one, and it is then determined whether or not the value N in stop event counter 130 is equal to three. If not, processing continues at step S45 in FIG. 13B. Otherwise, front continue upshift flag FCU is reset in a step S73, gear shift controller 130a controls the supply of power to move front derailleur motor 97fm in the reverse direction to return chain guide 154 to the position for front sprocket F1 in a step S74, and processing continues at step S45 in FIG. 13B.

It is then determined in step S45 whether or not a front downshift switch 132f has been turned on as a result of a switch lever 125 in front shift control device 120f or 121f rotating from position P0 to position P2. If so, it is then determined in a step S81 whether or not a value M stored in stop event counter 130e is equal to three. In this embodiment, gear shift controller 130b will retry downshift operations three times before first prohibition unit 130f provides signals to prevent any further downshift attempts. Thus, if the value M stored in stop event counter 130e is equal to three, a front continue downshift flag FCD is reset in a step S83, and the process continues at a step S46. On the other hand, if the value M stored in stop event counter 130e is not equal to three, it is then determined in a step S82 whether or not front derailleur 97f currently is at the operating position for sprocket F1 based on signals from front gear position sensor 133f. If so, then no further downshifting is possible, the downshift request is ignored, and processing continues at step S46. Otherwise, a front downshift flag FSD is set in a step S84, gear shift controller 130a provides a signal to start front derailleur motor 97fm in a step S85 so that front derailleur 97f begins to switch chain 95 from sprocket F2 to sprocket F1, and timer T2 is started in a step S86.

In any event, it is then determined in step S46 whether or not front downshift flag FSD has been set. If so, it is then determined in a step S87 whether or not the gear shift operation has completed (i.e., chain guide 154 is positioned at front sprocket F1) based on the output from front gear position sensor 133f and the data stored in memory 138. If so, then front downshift flag FSD and timer T2 both are reset in a step S93, and processing continues at a step S47. On the other hand, if the gear shift operation has not yet completed, it is then determined in a step S88 whether or not timer T2 has completed measuring the selected time interval t2. If not, then processing simply continues at step S47. If so, then gear shift stopping unit 130b provides one or more signals to gear shift controller 130a to stop the gear shift operation in a step S89 (whereupon gear shift controller 130a stops the supply of power to front derailleur motor 97fm), front downshift flag FSD is reset in a step S90, timer T3 is started in a step S91, and front continue downshift flag FCD is set in a step S92. Processing then continues at step S47.

It is then determined in step S47 whether or not front continue downshift flag FCD is set. If so, it is then determined in a step S94 whether or not timer T3 has completed measuring the selected time interval t3. If not, then processing simply continues at a step S48. If timer T3 has completed measuring the selected time interval t3, it is then determined in a step S95 whether or not the retry operation is in process. If not, then timer T2 is started in a step S96 and gear shift controller 130a continues the previously stopped gear shift operation in a step S97. In any event, it is then determined in a step S98 whether or not the gear shift operation has completed. If so, then front continue downshift flag FCD and timers T2 and T3 are reset in a step S105, the count value M in stop event counter 130e is reset to zero, and processing continues at step S48. However, if the gear shift operation has not completed, it is then determined in a step S99 whether or not timer T2 has completed measuring the selected time interval t2. If not, then processing simply continues at step S48. Otherwise, gear shift stopping unit 130b provides signals to gear shift controller 130a to stop the gear shift operation in a step S100, the value M in stop event counter 130e is incremented by one in a step S101, and it is then determined in a step S102 whether or not the value M in stop event counter 130 is equal to three. If not, processing continues at step S48. Otherwise, front continue downshift flag FCD is reset in a step S103, gear shift controller 130a controls the supply of power to run front derailleur motor 97fm in the reverse direction to return chain guide 154 to the position for front sprocket F2 in a step S104, and processing continues at step S48.

In any event, voltage sensor 136 reads the voltage of power supply 137 in step S48. It is then determined in a step S49 whether or not the power supply voltage is less than a voltage value VL (e.g., 3.5 volts). If so, then the values M and N in stop event counter 130e both are set to three in a step S107 so that any future requested upshift or downshift operations will be ignored.

In any event, it is then determined in a step S50 whether or not reset switch 139 has been activated. If so, then the values M and N in stop event counter 130e both are reset to zero in a step S108 to cancel any previously set prohibition by first prohibition unit 130f. Processing then proceeds to step S6 in FIG. 9B to perform any upshifting or downshifting requested for rear derailleur 97r. Thereafter, processing returns to step S42 in FIG. 13A.

In this embodiment, the retry operations carried out following steps S65 and S95 allow a gear shift operation to be accomplished after a transient problem is eliminated. On the other hand, if the problem does not resolve itself after three retries, then chain guide 154 returns to its original gear position and front derailleur motor 97fm stops to prevent deterioration in the useful life of power supply 137.

While the above is a description of various embodiments of inventive features, further modifications may be employed without departing from the spirit and scope of the present invention. For example, while the first and second embodiments described various unique operations of front derailleur 97f, the teachings herein could be applied to the operation of rear derailleur 97r. While the values of time intervals t1 and t2 were different for upshifting and downshifting, the time intervals t1 and t2 may be identical. The algorithms shown in FIGS. 9A, 9B, 13A and 13B are merely examples, and any algorithm that satisfies the functional construction for the controller 130 is acceptable. While the reset operation to cancel a previously established prohibition was executed using a dedicated reset switch 139, the reset operation could be executed by operating one of the gear shift control units 120f, 121f, 120r or 121r in a particular manner, such as by pressing lever 125 for a long period of time or by double-clicking lever 125.

While a gear shift control apparatus was described using a road-type bicycle as an example, the present invention may be applied in any type of bicycle having an electric gear shift apparatus. For example, the teachings herein may be applied to a motor used to operate a clutch for an internal hub transmission. While the rotation of front derailleur motor 97fm was detected using optical sensors, the rotation may be detected using many other types of sensors, such as sensors configured to directly detect the position of chain guide 154 or some other component. Alternatively, rotation of front derailleur motor 97fm may be detected using electric current or the like. While the disclosed embodiments used motors formed integrally with the derailleurs, the teachings herein may be applied to systems wherein an external motor is linked to a transmission via linking means such as a gear shift cable or a link.

While the described operations of front derailleur 97f were applied to both upshifting and downshifting operations, the described operations for front derailleur 97f could be disabled for the upshift and/or downshift operations using an optional disabling unit 134 shown in FIG. 12. Such disabling also could be applied if the teachings herein were applied to a rear derailleur. for example, the unique operations could be disabled during upshifting, which is used when riding downhill. In this case, whether or not to enable or disable an operation may be determined by detecting the direction of motor rotation via the output from the two optical sensors.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An apparatus for controlling a gear shift device based on movement of the gear shift device, wherein the apparatus comprises:
    a gear shift controller that operates the gear shift device from a first gear position to a second gear position during a gear shift operation;
    a movement sensor that detects movement of the gear shift device;
    a timer; and
    a gear shift stopping unit that provides a signal to the gear shift controller to stop the gear shift operation while the gear shift operation is in progress when the timer measures a first time interval during which the movement sensor does not sense movement of the gear shift device while the gear shift operation is in progress.

2. The apparatus according to claim 1 wherein the movement sensor detects rotation of the gear shift device.

3. The apparatus according to claim 2 wherein the movement sensor detects rotation of a motor of the gear shift device.

4. The apparatus according to claim 2 wherein the movement sensor comprises an optical rotation sensor.

5. The apparatus according to claim 4 wherein the optical rotation sensor senses a plurality of pulses during rotation of the gear shift device.

6. The apparatus according to claim 5 wherein the plurality of pulses indicate a direction of rotation of the gear shift device.

7. The apparatus according to claim 1 further comprising a power supply characteristic sensor that senses a characteristic of a power supply, wherein the gear shift stopping unit provides the signal to the gear shift controller to stop the gear shift operation in response to a selected power supply characteristic.

8. The apparatus according to claim 7 wherein the power supply characteristic comprises a voltage of the power supply.

9. The apparatus according to claim 8 wherein the gear shift stopping unit provides the signal to the gear shift controller to stop the gear shift operation when the voltage of the power supply is below a selected value.

10. The apparatus according to claim 1 further comprising a disabling unit that disables operation of the gear shift stopping unit.

11. The apparatus according to claim 1 wherein the gear shift controller moves the gear shift device to return to the first gear position when the gear shift operation is stopped.

12. The apparatus according to claim 1 further comprising a gear shift continuing unit that provides a signal to the gear shift controller to continue a previously stopped gear shift operation.

13. The apparatus according to claim 12 wherein the gear shift continuing unit provides the signal to the gear shift controller to continue the previously stopped gear shift operation after the timer measures a second time interval.

14. The apparatus according to claim 13 wherein the gear shift continuing unit provides the signal to the gear shift controller to continue the previously stopped gear shift operation after the timer measures the second time interval from approximately a moment when the gear shift operation was stopped.

15. The apparatus according to claim 14 wherein the gear shift stopping unit provides the signal to the gear shift controller to stop the gear shift operation when the timer measures a third time interval during which the movement sensor does not sense movement of the gear shift device after the gear shift operation is continued.

16. The apparatus according to claim 15 wherein the first time interval is the same as the third time interval.

17. The apparatus according to claim 16 wherein the gear shift controller moves the gear shift device to return to the first gear position when the continued gear shift operation is stopped.

18. The apparatus according to claim 15 further comprising a stop counter that counts a number of times the stopping unit provides the signal to the gear shift controller to stop the gear shift operation.

19. The apparatus according to claim 18 further comprising a prohibition unit that prohibits the gear shift controller from operating the gear shift device when a stop count value of the stop counter passes a selected value.

20. The apparatus according to claim 19 further comprising a prohibition canceling unit that cancels a prohibition caused by the prohibition unit.

21. The apparatus according to claim 1 further comprising a prohibition unit that prohibits the gear shift controller from operating the gear shift device upon a detected condition.

22. The apparatus according to claim 21 further comprising a prohibition canceling unit that cancels a prohibition caused by the prohibition unit.

* * * * *